United States Patent

Citron

[15] 3,694,084

[45] Sept. 26, 1972

[54] STROBOSCOPIC SPEED DISPLAY MEANS FOR MOVING VEHICLES

[72] Inventor: Joel P. Citron, 3252 Stanley Road, Akron, Ohio 44313

[22] Filed: March 23, 1970

[21] Appl. No.: 21,930

Related U.S. Application Data

[63] Continuation-in-part of Ser. No. 606,495, Nov. 30, 1966, abandoned.

[52] U.S. Cl. ......................356/25, 356/27, 356/28
[51] Int. Cl. ..................................................G01p 3/40
[58] Field of Search..................................356/23–28

[56] References Cited

UNITED STATES PATENTS 2,514,619   7/1950   Anderson ....................356/23

FOREIGN PATENTS OR APPLICATIONS 346,833   4/1931   Great Britain..............356/25

*Primary Examiner*—Ronald L. Wibert
*Assistant Examiner*—F. L. Evans
*Attorney*—Oldham & Oldham

[57] ABSTRACT

This invention relates generally to relative speed-indicating means and more particularly to a visual display system for enabling an abstract visual comparison of the relative speed of one moving vehicle with respect to another and further to means capable of presenting an abstract visual display to the operator of a moving vehicle of the required desirable vehicle speed, said latter presentation being dictated remotely from a fixed station situated externally of the moving vehicle or directly to the operator from means within the vehicle.

18 Claims, 11 Drawing Figures

PATENTED SEP 26 1972 3,694,084

INVENTOR
Joel P. Citron

BY *Clive H. Bramson*
ATTORNEY

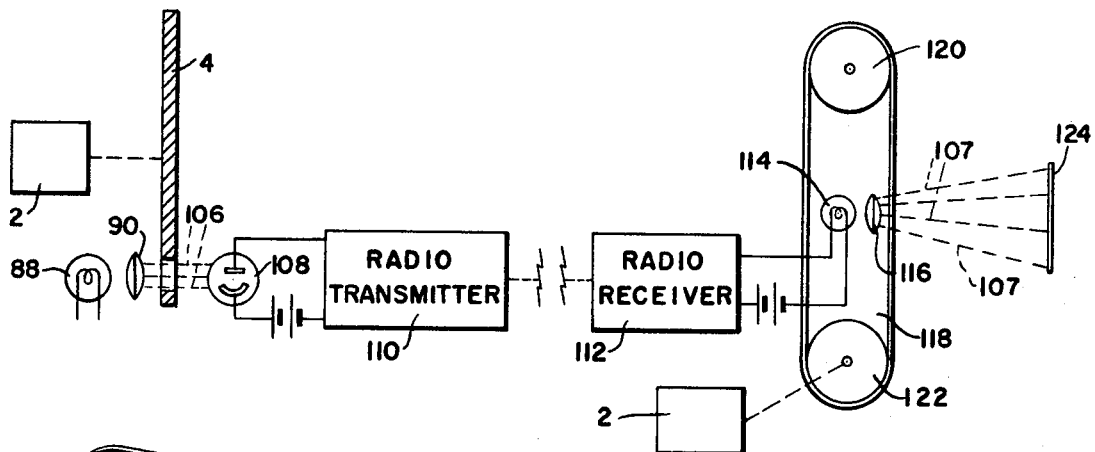
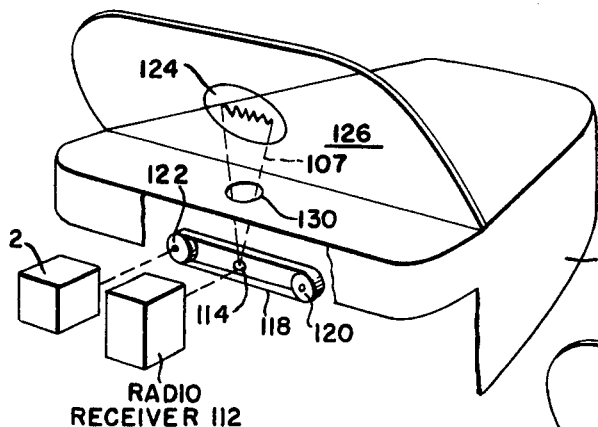
FIG. 5.
FIG. 6.
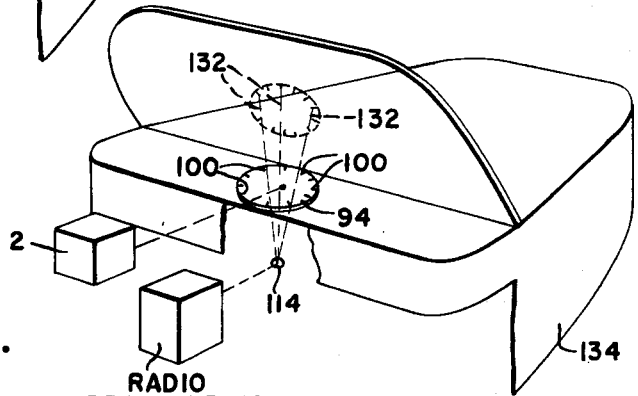
FIG. 7.
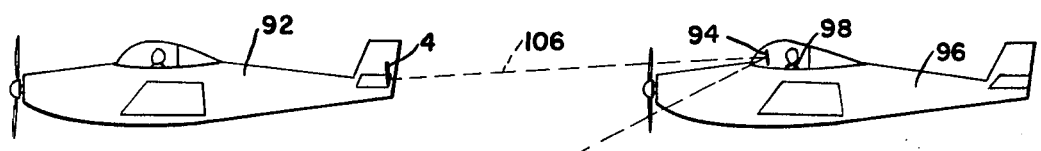
FIG. 8.
INVENTOR
Joel P. Citron
BY Clive H. Bramson
ATTORNEY INVENTOR
Joel P. Citron Oldham & Oldham
ATTORNEYS

STROBOSCOPIC SPEED DISPLAY MEANS FOR MOVING VEHICLES

This application is a continuation-in-part of my co-pending application, Ser. No. 606,495, filed Nov. 30, 1966, entitled "STROBOSCOPIC DISPLAY MEANS FOR MOVING VEHICLES" now abandoned.

Essentially, the present invention is directed to a novel system embodying the application of well-known stroboscopic perception phenomena whereby the equalization of the relative speed of first and second moving vehicles can be readily accomplished or whereby the desired speed of a moving vehicle with respect to a ground reference point can be expeditiously achieved and visually displayed to the operator of the vehicle, said operator being able to focus his vision through the windshield of the vehicle while viewing the visual display. The stroboscopic display utilized herein is abstract and may be presented as a repeating motion picture image or as a rotating transparent disc having opaque peripheral markings thereon. When the image or markings so presented appear to "stand still" although the film, disc, or other suitable display means is moving, the speed of the vehicle in which the display is presented will be equal to the speed of the vehicle being compared, or identical to the speed being dictated by a control station, or by a setting within the vehicle. Should the vehicle not be moving at the desired rate, the display appears to be moving in one direction or the other.

It is well known that the stroboscopic phenomenon is demonstrated when viewing spots on a rotating disc under the illumination of light emitted by a regularly pulsating light source. Where the spots of the disc are seen to "stand still," the frequency of the rotating disc, measured e.g., as cycles per second, corresponds exactly to the frequency of the pulsating light. Should the spots appear to advance in the direction of the disc's rotation, the speed of the disc will be greater than that of the pulsating light. Conversely, where the spot appears to recede or move oppositely with respect to the direction of rotation of the disc, the speed of the disc will be less than the speed of the pulsating light.

Although the invention is applicable to vehicles of diverse nature, such as air, land, sea and space vehicles, the manner of adaptation thereof to aircraft will be particularly described herein, it being understood, however, that such specificity is merely exemplary and explanatory and is not intended in a limiting sense.

Heretofore, stroboscopic means have been utilized to indicate whether rotating members are in synchronism and in phase with one another and for the purpose of synchronizing the moving parts of first and second machinery systems, each system or machine, however, being stationary with respect to the other and with respect, therefore, to a common frame of reference, to wit, earth.

As aforementioned, however, the instant invention is concerned with the comparative speeds of moving aircraft or of a moving aircraft and a fixed point, said moving aircraft being in motion relative to one another or to an external reference station, such as, e.g., a landing strip. The stroboscopic presentation comprises means whereby the comparative speed of a first aircraft moving with respect to the earth and/or with respect to another moving aircraft can, as aforesaid, be correlated to synchronize with a pulsating signal emanating from a stationary source having zero ground speed, from said other aircraft which is also in motion relative to the ground, or from within the vehicle itself.

The pulsating signal as will be disclosed herein, may be a direct beam of pulsating light emanating from a first moving aircraft or from a fixed station, said beam of pulsating light being directed upon a rotating transparent disc located in a second moving aircraft, said transparent disc being positioned whereby the pilot can observe or view through said disc while maintaining his vision through the windshield of his aircraft. Alternatively, the pulsating beam of light can, through well known photoelectric means, be transformed into a pulsating radio signal which is transmitted from said first aircraft or fixed station and received by a radio receiver in said second aircraft, transformed back into a pulsating light source, the latter being then directed upon the aforesaid rotating transparent disc or focussed through a moving film strip to create an image, said disc or image being disposed in the line of vision of the pilot. Accordingly, then, if the disc or markings thereon, or the image appear stationary to the pilot, his airspeed will be identical to the airspeed of the first aircraft transmitting the original pulsating light beam or radio signal, said light beam or radio signal being transmitted at a frequency geared or correlated to the airspeed of the first aircraft or if emanating from a fixed station, then at a frequency in consonance with the desirable airspeed of the second aircraft.

It is the means disclosed herein enabling such correlation between airspeed and pulsating signal and the further correlation of airspeeds and a pulsating signal between two moving vehicles which, inter alia, comprises the advance in the art disclosed herein.

By dint of the present invention, the pilot of an aircraft which is following another aircraft, e.g., need not be concerned with his airspeed indicator reading or his visual perception exteriorly of the aircraft for an awareness as to whether he is closing or opening the distance between his aircraft and the aircraft thereahead. He need only observe the rotating disc or image display while maintaining a "heads-up" attitude. Thus, if the markings on the disc or the image appear to be stationary, he will known that the speed of his aircraft is equal to the airspeed of the aircraft being followed. Should the markings or image appear to be moving forward or backwards, he will increase or decrease his airspeed, respectively, in order to render said markings or image stationary and thereby equalize his airspeed with respect to the airspeed of the other aircraft.

The importance and advantage of the present invention will be appreciated upon consideration of the speeds at which modern aircraft are capable, the complexity of the instrumentation thereof, and the present difficulty of determining relative airspeeds under instrument flying conditions. The value of an abstract visual display such as herein disclosed will, therefore, be readily appreciated.

Further, when landing an aircraft, the approach speed and the speed of the aircraft while in the landing pattern are of extreme importance and must accordingly be maintained or varied in comformity to the nature of the aircraft, the nature of the runway, the landing conditions, etc. When formation flying, the maintenance of the aircraft in their respective flying stations is of primary concern. Although the flight leader generally establishes the common airspeed, each pilot in the formation will usually depend upon his visual observation of adjacent aircraft in maintaining the desired range between his and the other aircraft.

To maintain a desired airspeed by continual reference only to the airspeed indicator would be virtually impossible where it is concurrently necessary that he be aware of conditions externally of his aircraft, such as the presence of other aircraft, his position relative thereto, his alignment with the runway, etc. Further, his required attention to the myriad of other aircraft instrumentation precludes uninterrupted observation of his airspeed indicator. Additionally, however, there are many instances where an airspeed indicator cannot disclose whether a pilot is closing or opening the distance between his and the aircraft ahead of or adjacent his, such as when he is unaware of the airspeed of the other aircraft. Inasmuch as visual perception alone is often deceiving and therefore unreliable or in fact, at times, impossible because of poor visibility, the present invention will be seen to be of extreme benefit to the pilot of an aircraft.

Accordingly, and in consonance with the foregoing, the instant invention has for an object the provision of stroboscopic rate-indicating means permitting a heads-up visual display of the relative speeds of moving vehicles.

Another object of the present invention is to provide a device of the foregoing character which will afford a visual stroboscopic display to the operator of a moving vehicle of his speed relative to the desired speed being dictated by a station remotely situated with respect to his vehicle.

A further object of this invention resides in the provision of a visual stroboscopic display to the operator of a vehicle, said display being correlated with a pulsating light and generated from within the vehicle, and said pulsating light being further correlated with respect to the varying speed of the vehicle.

Another object of the present invention is to provide a device in accordance with the foregoing which includes means for generating and transmitting a predetermined pulsating light or radio signal within a moving aircraft, the frequency of said predetermined pulsating light or signal being variable in response to the speed of the aircraft.

Still another object of the instant invention is to provide a stroboscopic display within a moving aircraft including moving pulsating light display means and means for varying the movement of said display means in response to the airspeed of said aircraft.

A further general object of the present invention resides in the provision of a stroboscopic speed display means for moving vehicles which will be simple in structure, easily and quickly installed and highly effective in use.

Other objects and advantages of the instant invention will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate the invention, and together with the description, serve to explain the principles of the invention.

FIG. 5 illustrates an alternate embodiment for practicing the present invention wherein the pulsating light is converted into a pulsating radio signal at the transmitting end and reconverted into a pulsating light at the receiving end and wherein a driven endless film strip is utilized to form the stroboscopic display image;

FIG. 6 is a perspective view showing a system for displaying the film image on the windshield of a vehicle;

FIG. 7 is a perspective view illustrating a system for displaying the rotating transparent disc on the windshield of a vehicle;

FIG. 8 is a view showing the reception of a pulsating light upon a rotating transparent disc where the latter is disposed directly in the line of vision of the pilot of an aircraft, said pulsating light being emanated from another moving aircraft and/or from a stationary control tower;

Figure 1:
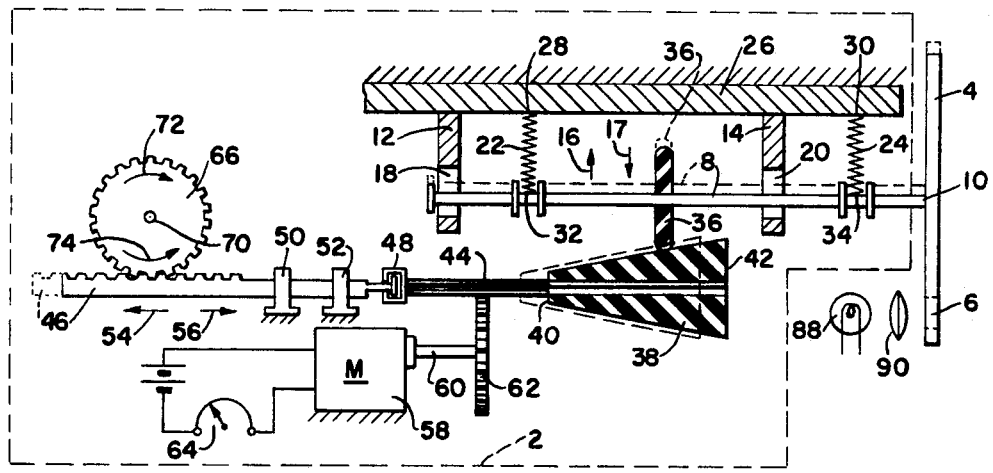
FIG. 1 is a side elevational cross-sectional view of a simplified schematic embodiment of means capable of varying the predetermined rotational rate of a rotating member in response to variations of the speed of the vehicle in which said structural means is contained.
Figure 2:
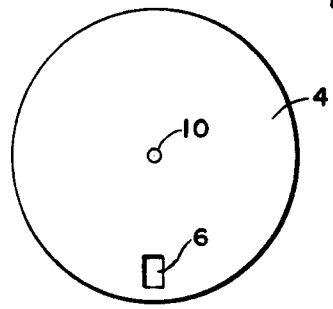
FIG. 2 is a plan view of the rotating apertured member shown in FIG. 1.
Figure 3:
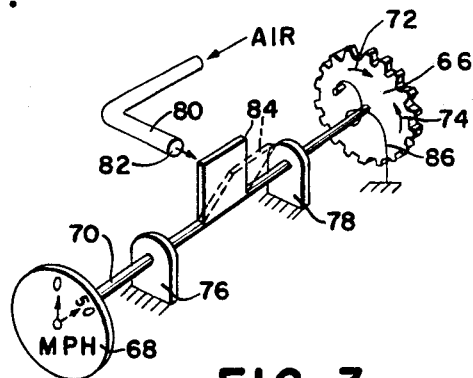
FIG. 3 is a perspective view of the means interconnecting the vehicle's speed indicator and said rotating member to thereby correlate the latter with respect to the varying speed of said vehicle.

Referring now in detail to the present preferred embodiment of the invention illustrated in the accompanying drawings, FIGS. 1–3 show structural means utilized for transmitting a pulsating light emission, the isolated portion 2 of the apparatus shown in FIG. 1 being employed in both the transmitting and receiving stations as will be described hereinbelow following.

The stroboscopic apparatus shown in FIG. 1 includes movable member 4 which is an opaque disc having an aperture 6 provided therethrough and a drive shaft 8 which is drivingly connected concentrically of said opaque disc at 10, said drive shaft being journalled for rotation within support arms 12 and 14 and being capable of movement in the direction of arrows 16, 17 by reason of slots 18 and 20 within which said drive shaft rotates. Compression springs 22 and 24 which are attached to base 26 at 28 and 30, respectively, slidingly engage said drive shaft at 32 and 34 to thereby continually urge the latter in the direction of arrow 17. Follower wheel 36, which is formed of rubber or other suitable frictional material, is concentrically mounted upon said drive shaft and by reason of said compression springs 22 and 24, is continually urged against speed cone 38 which is also formed of rubber or other suitable frictional material. Said speed cone comprises smaller and larger ends 40 and 42, respectively, the cross-sectional diameters included therebetween increasing from the smaller to the larger end to thereby provide the conical taper herein utilized to vary the rotational frequency of said opaque disc in response to the speed of the vehicle in which the instant stroboscopic apparatus is mounted.

Elongate gear 44, which is arranged in parallelism with respect to said drive shaft, extends axially from said smaller end 40 of said speed cone, gear rack 46 being connected to said elongate gear by means of swivel 48 whereby said elongate gear 44 can rotate while said gear rack 46 is precluded against rotation by slide blocks 50 and 52 through which said gear rack is slidable in the direction of arrows 54 and 56.

Electric motor 58, which includes shaft 60 and drive gear 62, constitutes the prime mover of said opaque disc 4, said drive gear 62 being in slidable meshing engagement with elongate gear 44 as shown in the drawings. Rheostat 64, schematically illustrated, permits regulation of the drive rate of said electric motor and thus the setting of a predetermined rotational rate of said opaque disc 4.

Pinion gear 66, which is in meshing engagement with gear rack 46 as seen in FIG. 1, is movably connected to speed indicator instrument 68 through a common connecting shaft 70 as shown in FIG. 3, said pinion gear being capable of rotation as indicated by arrows 72 and 74 but being incapable of other movement by reason of stationary bearing mounts 76 and 78. The stroboscopic apparatus illustrated herein is, for exemplary purposes, mounted within an aircraft, said speed indicating instrument 68 being therefore responsive to the forced air flow through conventional pitot tube 80. Thus, as the airplane moves through the air, a forced air flow or pressure egresses from end 82 of said pitot tube and impinges against fin 84 which is fixedly mounted upon said connecting shaft 70. Depending upon the pressure of said air flow, which in turn is dependent upon the speed of the aircraft (air or ground speed), said fin will be deflected as, e.g., shown herein in broken line designation, pinion gear 66 being therefore caused to rotate in the direction of arrow 72. Spring 86 is provided to restore said pinion gear, fin and speed indicating instrument to the 0 position when the speed of the aircraft is zero.

As will be observed in FIG. 1, rotation of pinion gear 66 in response to the 50 mph airspeed of the aircraft, causes movement of said speed cone, gear rack, follower wheel and drive shaft to the indicated respective broken line positions, thereby occasioning an increase in the rotational rate of opaque disc 4. It will be appreciated that the rotational rate of said opaque disc will be increased or decreased in response to the variation of the speed of the vehicle over the speed range of said vehicle although the drive rate of electric motor 58 will remain constant at the preset level.

Light-emitting source 88, which is preferably of the incandescent monochromatic light-emitting type, and lens 90 provided adjacently thereto, cause a beam of light to be directed upon said rotating opaque disc 4, that part of said beam of light passing through said aperture 6 being of pulsating character and of a frequency depending upon the speed of rotation of said opaque disc.

Figure 4:
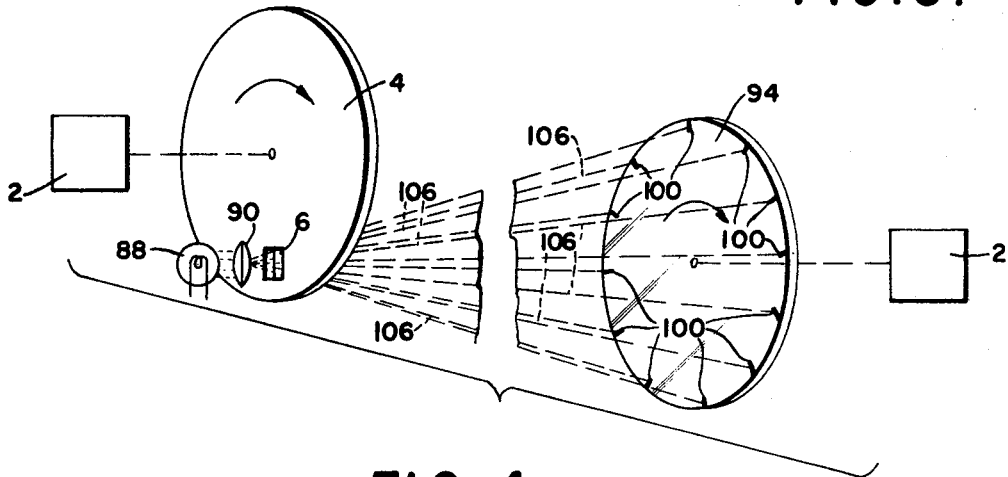
FIG. 4 is a perspective view of pulsating light transmitting and receiving means.

With reference now to FIGS. 4 and 8 of the drawings, it will be seen that the pulsating beam of light emitted through said aperture 6 of the opaque disc 4 mounted in aircraft 92, is directed upon rotating transparent disc 94 which is mounted in moving aircraft 96 and in the line of vision of pilot 98 thereof. Said transparent disc is peripherally or radially marked at points 100 in a color complementary to that of the monochromatic pulsating light beam. Accordingly, when discs 4 and 94 are rotating at equal frequencies, the markings 100 on disc 94 would appear black to the pilot as stationary markings.

As illustrated in the accompanying drawings, the structural portion 2 of the stroboscopic apparatus shown in FIG. 1 thereof, is utilized to drive discs 4 and 94, said structural portion 2 being similarly provided in each of aircraft 92 and 96, each said portion being therefore, pre-settable with respect to the basic drive rate provided by electric motor 58 and being variable with respect to the speed of each aircraft.

In operation, the pilots of aircraft 92 and 96 would each set their respective rheostats 64 at identical prime mover drive rates corresponding, e.g., to 100 mph, the approximate rate at which said aircraft are moving. Thus, they will have established identical frequencies with respect to the pulsating light beam emitted from aircraft 92 and the frequency of rotation of markings 100 in aircraft 96, assuming that said aircraft are travelling at identical speeds with respect to one another. Where, however, aircraft 96 is travelling at a speed greater than aircraft 92, so that the range therebetween is diminishing, pilot 98 will observe that markings 100 appear to be advancing and in order to equalize his speed with respect to aircraft 92, he will have to lessen the speed of his aircraft to a point where said markings will appear to remain stationary. Conversely, where said markings appear to be receding, increasing the speed of his aircraft would be in order for the obtention of a stationary visual display.

With reference again to FIG. 8 of the drawings, control tower 102 positioned on the ground 104, is shown emitting a pulsating light beam 106. Assuming, e.g., that pilot 98 has been instructed that his required approach landing speed is 85 mph, the control tower operator will preset rheostat 64 of his structural portion 2 at an arbitrary pre-established setting corresponding to a pulsating light beam 106 emission frequency of 85 mph, and pilot 98 will do the same with respect to rheostat aboard his aircraft. He will thereafter adjust his airspeed to establish a stationary pattern of markings 100, his line of vision being through the windshield at all times. It will be appreciated that the pulsating light emission being generated from control tower 102 can readily be generated synthetically from within aircraft 96, pilot 98 having to then adjust two rheostat settings. That is, his aircraft will contain both counterparts of the system shown in FIG. 4, with the exception that opaque disc 4 of the pulsating light beam emitting apparatus will not be connected to the airspeed indicating instrument and will therefore render a pulsating light beam of a frequency controlled only by the setting of rheostat 64 thereof. Transparent disc 94, will however, rotate in response to the setting of rheostat 64 and the airspeed indicator embodied in the portion 2 associated with said disc 94.

The modified embodiment of the present invention illustrated in FIG. 5 of the drawings includes means whereby the pulsating light emission 106 can be transmitted from one moving vehicle to another or from a stationary point to a moving vehicle in the form of a signal which will be received by another vehicle and again transformed into its original pulsating light form for presentation upon a visual stroboscopic display. More specifically, the signal form preferred herein is a radio signal which can presently be transmitted and received between moving vehicles in accordance with methods commonly employed in this art.

In FIG. 5, stroboscopic apparatus portion 2 is shown drivingly associated with rotating opaque disc 4, numerical characters being used in said Figure to designate like parts shown in the other Figures of this disclosure. Light source 88 and lens 90 which direct a beam upon rotating opaque disc 4, in view of aperture 6 provided through said disc 4, create aforesaid pulsating light emission 106 which is thereafter directed upon photoelectric cell 108, said photoelectric cell functioning to convert said light emission into a pulsating current which is thereafter fed to radio transmitter 110, amplified thereby and transmitted to radio receiver 112. The pulsating radio signal thus received is then utilized to modulate an electrical current supplied to light source 114 thereby causing said light source to emit a pulsating light 107 equivalent in frequency to the pulsating light 106 created at the transmitting end of the system. Lens 116 permits focusing of said pulsating light 107 through an endless film strip 118 which is movably or rotatably mounted upon idler roller 120 and drive roller 122, stroboscopic apparatus portion 2 being arranged to rotate said drive roller 122 in the manner hereinabove set forth with respect to the disc-type rotatable members. Said film strip 118 is divided into frame sections, each frame section containing identical images. Thus, when said film strip or the frames thereof move at the same frequency as the frequency of pulsating light 106 or 107, the vehicles containing the transmitting and receiving apparatus will be moving at the same speeds, assuming, of course, like settings of the respective rheostats 64. When such vehicle speeds are thus equivalent, image 124 which can be projected upon windshield 126 of the aircraft 128, will appear to the pilot thereof as a stationary image. Such projection of the stroboscopic visual display upon the windshield of the aircraft is shown in FIGS. 6 and 7 of the drawings wherein a film strip and a transparent disc, respectively, are utilized to present the abstract visual display.

In FIG. 6, pulsating light emission 107 is projected through an opening 130 in the dashboard of aircraft 128, the movable film strip and associated apparatus being mounted therebeneath.

In FIG. 7 a rotating transparent disc 94 with markings 100 is used in lieu of the rotating film strip, all remaining parts being the same as shown in FIG. 6. Inasmuch as the pulsating light emission 132 is established by radio transmission, reception and conversion as above described, said disc can conveniently be positioned at any desired position within the aircraft 134 and as shown in FIG. 7 is positioned whereby the display can be projected or reflected upon the windshield whereby the pilot can, while in a "heads-up" position, regulate his airspeed to obtain a stationary display.

Figure 9:
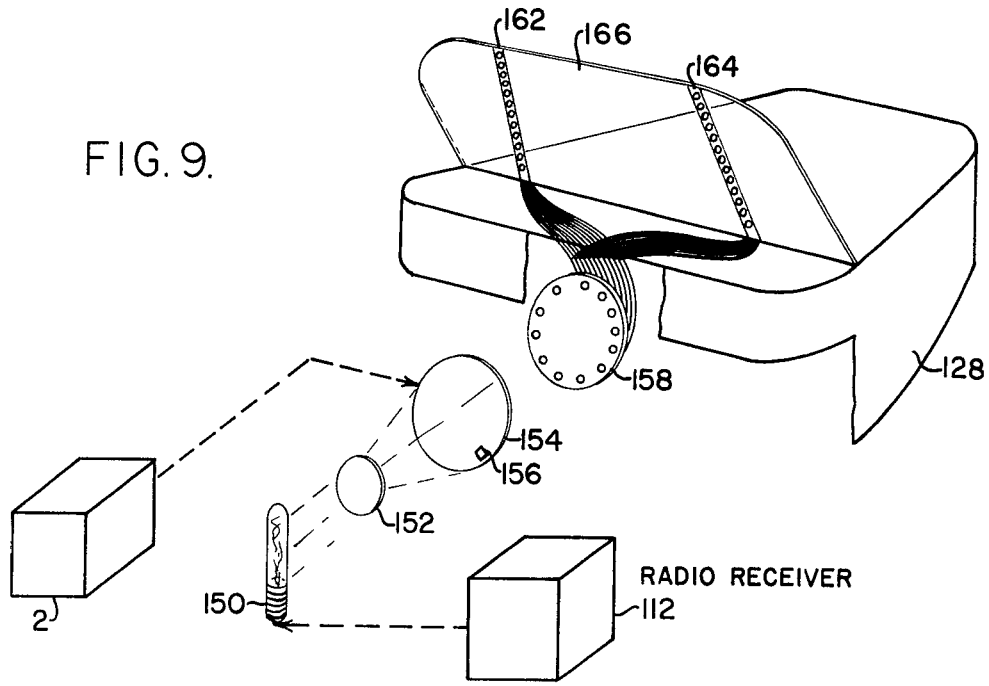
FIG. 9 is a perspective view illustrating a modified display configuration which is a peripheral vision human factors display configuration mounted to an opaque portion of the windshield or windscreen.

In FIG. 9 applicant is illustrating by a perspective view a modified display system which still utilizes the principles of the invention. Specifically, the unit 2 is indicated by a block as is the radio receiver 112 in a similar manner to the showings in FIGS. 6 and 7. In this instance, however, the receiver 112 drives a pulsating light source 150. The source 150 acts through a lens 152 in cooperation with the rotating disc 154. The rotating disc 154 is driven at its appropriate rotation speed by unit 2 in the same manner to that defined above. The disc 154 have one or more variable number or size apertures 156 therethrough which cooperates with a stationary plate, which carries a plurality of fiber optic bundles 160 arranged in a circular configuration around the periphery at essentially equally spaced configurations to cooperate with light passage through the aperture or slot 156 in disc 154. The fiber optic bundles 160 are biforcated and extend to respective outputs in strips 162 and 164 mounted to the windshield or windscreen 166. Preferably, the strips 162 and 164 are opaque or are actually the normal holding strips which hold the windshield in position that are utilized in most vehicle windshields where a large sweep of the windshield is present. In any event, the strips are placed so that they are at the peripheral viewing area of the vehicle operator, and hence are visible through both his left and right peripheral vision.

The fiber optic bundles 160 leaving plate 158 are biforcated at point 168 so that each bundle extends to each of the strips 162 and 164 which changes the circular configuration of the plate 158 to a linear configuration. In other words, the output ends of the fiber optic bundles 160 in the strips 162 and 164 are a linear configuration of the circular plate arrangement to provide symetrical linear arrays in the left and right peripheral fields of vision.

Considerable freedom as to the location of the linear arrays or strip 162 and 164 is possible as long as they do lie in the periphery of the visual field. The invention contemplates that the strips will be made to adhere to the transparent surface or fastened to the already naturally opaque structural material used to support the transparent material. This would provide a functional visual purpose of this heretofore unused area of the visual field. In an automobile configuration, they might be attached to the dashboard or to the hood of the vehicle.

The light source of bulb 150 flickers or pulsates as a function of the velocity of a guide vehicle (or synthetic reference source) as described above and is received through radio receiver 112. The rotating penetrated disc has a rotation velocity which is a function of the speed of the own vehicle. If the cycling of the one matches the cycling of the other, as the same time, there will be a stationary light spot on the linear strips 162 and 164. A mismatch of the cycling would present a stroboscopic advancement or recession representing as desired an increase or decrease in relative speed between the two representative points.

It should also be understood that other parameters than speed (or relative speed) could be displayed in this manner. For example, the pitch of an aircraft, oil pressure, or any other function which could be monitored, and for which it would be desirable to tell immediately by peripheral vision when it changed, and how it changed.

Figure 10:
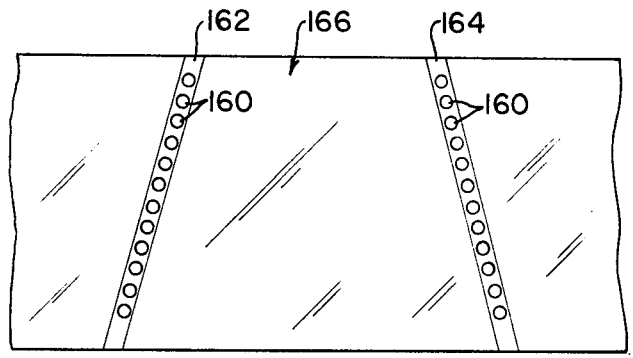
FIG. 10 is an enlarged broken away view of the windscreen of FIG. 9.

FIG. 10 illustrates the wind screen 166 and the actual view that the vehicle operator would have of strips 162 and 164, and the ends 160 of the fiber optic bundles in their relatively uniformly spaced linear relationship in strips 162 and 164. Note that a perspective view is achieved by the angled relation of the strips 162 and 164 to better tell when the relative displacement is opening or closing.

Figure 11:
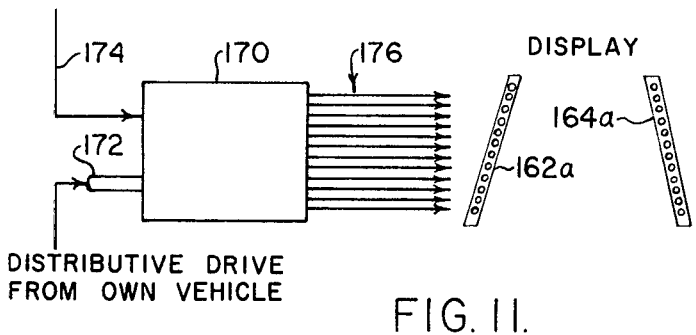
FIG. 11 is a block diagram schematic of an electrical modification that could cooperate with the structure of FIG. 9.

In place of the fiber optic arrangement of FIG. 9, an electrical approach is illustrated in FIG. 11. This electrical approach includes a distributor 170 which has a mechanically driven distributive drive or shaft 172 and an electrical current input 174 which according to the position of the distributive drive shaft 172 will be presented to one of a plurality of outputs 176 the same as an automobile spark distributor. The outputs 176 could be directly electrically connected to corresponding light bulbs, for example, in linear arrays 162a and 164a to achieve the same stroboscopic effect as the fiber optic bundles described with respect to FIGS. 9 and 10. The input current into the distributor 170 over line 174 would fluctuate or be a function of the velocity of the lead or reference source vehicle. The speed of the distributor rotation or drive to shaft 172 would be a function of the following or own vehicle speed.

Naturally, if the distributive drive 172 actually covered more than one of the outputs 176 simultaneously, it would be the equivalent of having more than one aperture in the disc 154 of FIG. 9, and would provide a human factor situation that might be better because there would be multiple moving spots in effect following each other which could be easier to detect and readily understand when viewed in the peripheral vision.

Accordingly, it will be appreciated that the present invention can be utilized where the two moving objects have substantially different speeds, e.g., an aircraft carrier and an approaching aircraft. Another application of this system would be in automobiles, the speedometer cables thereof being suitably employed to variably control the frequency of rotation of the rotatable members.

Having described the preferred embodiments of the stroboscopic display apparatus, it will be further appreciated that within the purview of this invention various changes may be made in the forms, details, proportion and arrangement of parts, the combination thereof and mode of operation, which generally stated consists in a device capable of carrying out the objects set forth as disclosed and defined in the appended claims.

What is claimed is:

1. A stroboscopic display for a moving passenger vehicle which comprises:
   1. means to visually see from the vehicle substantially on a line of sight along the line of movement thereof,
   2. first stroboscopic apparatus mounted in the vehicle comprising a movable member, a light-emitting source to direct light upon said movable member, and a prime mover for rotating said movable member,
   3. a second stroboscopic apparatus comprising structure similar to said first apparatus mounted at a spaced independent position from said vehicle,
   4. first control means for each stroboscopic apparatus for manually regulating the drive rate of said respective prime mover at a predetermined rate,
   5. second control means for each stroboscopic apparatus for varying the rotational rate of its respective said movable member independently of its respective first control means, said second control means for said first stroboscopic apparatus responsive to the speed of the vehicle along the line of movement, and
   6. means to create a superimposed abstract visual display of the movable member from each stroboscopic apparatus adjacent to the line of sight along the line of movement of the vehicle.

2. Stroboscopic apparatus as set forth in claim 1 wherein said movable member comprises an opaque disc having aperture means therethrough.

3. Stroboscopic apparatus as set forth in claim 1 wherein said movable member comprises a transparent disc having opaque markings uniformly and radially provided thereon.

4. Stroboscopic apparatus as set forth in claim 1 wherein said movable member comprises an endless film strip having a plurality of image frames; each of the latter being identical.

5. Stroboscopic apparatus as set forth in claim 2 including a drive shaft drivingly connected to said opaque disc, support means by which said drive shaft is rotatably journalled and supported for movement in a direction parallel to said drive shaft, a follower wheel concentrically mounted upon said drive shaft, a speed cone having cross-sectional diameters tapering from a smaller to a larger end, said speed cone being frictionally engaged with said follower wheel, bias means urging said follower wheel against said speed cone, an elongate gear arranged in parallelism with respect to said drive shaft and extending axially from said smaller end of said speed cone, said prime mover comprising an electric motor including a shaft and a drive gear, said drive gear being in sliding engagement with said elongate gear, said first control means comprising a rheostat connected in series with said electric motor, said second control means comprising a gear rack swivelly connected to said elongate gear and a pinion gear, the latter being in meshing engagement with said gear rack, said pinion gear being movably connected to the speed indicating means of said vehicle.

6. Stroboscopic apparatus as set forth in claim 4 wherein said endless film strip is mounted for rotation about a roller, a drive shaft drivingly connected to said roller, support means by which said drive shaft is rotatably journalled and supported for movement in a direction parallel to said drive shaft, a follower wheel concentrically mounted upon said drive shaft, a speed cone having cross-sectional diameters tapering from a smaller to a larger end, said speed cone being frictionally engaged with said follower wheel, bias means urging said follower wheel against said speed cone, an elongate gear extending horizontally and concentrically from said smaller end of said speed cone, said prime mover comprising an electric motor including a shaft and a drive gear, said drive gear being in sliding engagement with said elongate gear, said first control means comprising a rheostat connected in series with said electric motor, said second control means comprising a gear rack swivelly connected to said elongate gear and a pinion gear, the latter being in meshing engagement with said gear rack, said pinion gear being movably connected to the speed-indicating means of said vehicle.

7. Stroboscopic apparatus as set forth in claim 2 wherein said light source is directed through said aperture means as said opaque disc rotates to thereby create a pulsating light emission, photoelectric means in the path of said pulsating light emission, radio signal transmitting means in circuit with said photoelectric means, said radio signal transmitting means transmitting a radio signal having a frequency equal to the frequency of said pulsating light emission.

8. Stroboscopic apparatus as set forth in claim 4 including radio signal receiving means in circuit with said light-emitting source whereby light emitted from said light-emitting source is modulated by a received radio signal to provide a pulsating light emission equal in frequency to the frequency of said radio signal, said pulsating light emission being directed upon said endless film strip.

9. A stroboscopic display according to claim 1 which includes means to provide a linear stroboscopic display in the peripheral vision of the vehicle operator in the form of a linear arrangement of a row of lights.

10. A stroboscopic apparatus according to claim 9 where the peripheral display is on an opaque portion of the field of view and is to both the left and right side of the peripheral vision of the normal line of sight along the line of movement of the vehicle.

11. Apparatus for indicating the relationship between the speed of a vehicle and a reference speed, comprising:
   first means for generating a signal pulsating at a frequency proportional to the reference speed;
   receiver means carried by the vehicle for receiving the signal from the first means and operative to produce a light beam which pulsates at a frequency proportional to the signal frequency;
   a member having at least one opaque and at least one transparent region;
   drive means for moving the member in a cyclic path at a speed proportional to vehicle speed whereby the opaque and transparent regions successively intersect the path of the light beam; and
   a target receiving the light passing through the transparent regions to provide a visual indication of the speed relationship.

12. Apparatus according to claim 11 wherein the first means includes a light source, an additional member having at least one opaque region and at least one transparent region, and additional drive means for moving the additional member in a cyclic path at a speed proportional to the reference speed whereby the opaque and transparent regions successively intersect the light to produce a pulsating light beam having a frequency proportional to the reference speed.

13. Apparatus according to claim 12 wherein said first means further includes photoelectric device receiving the pulsating light beam from said light source and a radio transmitter controlled by the photoelectric device, the receiver means including a radio receiver.

14. Apparatus according to claim 12 wherein each drive means includes a prime mover, and a variable drive means connecting the prime mover to the associated member, the prime movers of each drive means rotating at the same speed.

15. Apparatus according to claim 14 wherein each variable drive means includes a fustroconical friction surfaced drive wheel rotated by the prime mover, a friction surfaced follower wheel in driven engagement with the surface of the fustroconical wheel and connected to drive the member, and means to shift the position of the driven wheel on the fustroconical wheel in accordance with speed changes.

16. Apparatus according to claim 11 wherein the first means is located in an additional vehicle, the reference speed being the speed of the additional vehicle.

17. Apparatus according to claim 11 wherein the member is a disc rotatable about it center and having the opaque and transparent regions at equally spaced annular intervals.

18. Apparatus according to claim 11 wherein the member is an endless belt having the opaque and transparent regions at equally spaced intervals.

* * * * *